United States Patent [19]

Marinitsch

[11] Patent Number: 5,151,682
[45] Date of Patent: Sep. 29, 1992

[54] FAIL-SAFE TESTING OF AN INFRARED SENSOR ARRANGEMENT

[76] Inventor: Waldemar Marinitsch, Putzbrunner Str. 43, 8 Munich 83, Fed. Rep. of Germany

[21] Appl. No.: 711,534

[22] Filed: Jun. 10, 1991

[30] Foreign Application Priority Data

Jun. 25, 1990 [DE] Fed. Rep. of Germany ....... 4020175

[51] Int. Cl.[5] ............................................. G08B 29/00
[52] U.S. Cl. .................................... 340/514; 340/515; 340/565
[58] Field of Search ......................... 340/514, 515, 565

[56] References Cited

U.S. PATENT DOCUMENTS 3,882,477  5/1975  Mueller ............................. 340/515
4,743,886  5/1988  Steiner et al. ....................... 340/565

FOREIGN PATENT DOCUMENTS 3837054  10/1988  Fed. Rep. of Germany.
3909073  3/1989  Fed. Rep. of Germany.

Primary Examiner—Donnie L. Crosland
Attorney, Agent, or Firm—Sixbey, Friedman, Leedom & Ferguson

[57] ABSTRACT

Device for fail-safe testing of a condition indicating device including at least one infrared sensor. The infrared sensor is connected by amplifiers to comparators which have different threshold values and have outputs connected to a microprocessor. An infrared signal transmitter is actuated by the microprocessor at periodic intervals to produce signals which are detectable by the infrared sensor. The microprocessor delivers an alarm signal if the test signal is not received by the infrared sensor within a specified period after triggering of the transmitter. The microprocessor also monitors the time occurrence of noise signals produced by the infrared sensor, and produces an alarm if no noise signals are received within a specified period. During monitoring of reception of transmitted test signals, monitoring of the noise signals is interrupted to prevent the test signal reception from being processed as a noise signal. In another preferred embodiment, the infrared signal transmitter is positioned several meters from the infrared sensor, and actuated through coded infrared transmissions from the control circuits. In this embodiment, no noise monitoring is required.

24 Claims, 9 Drawing Sheets

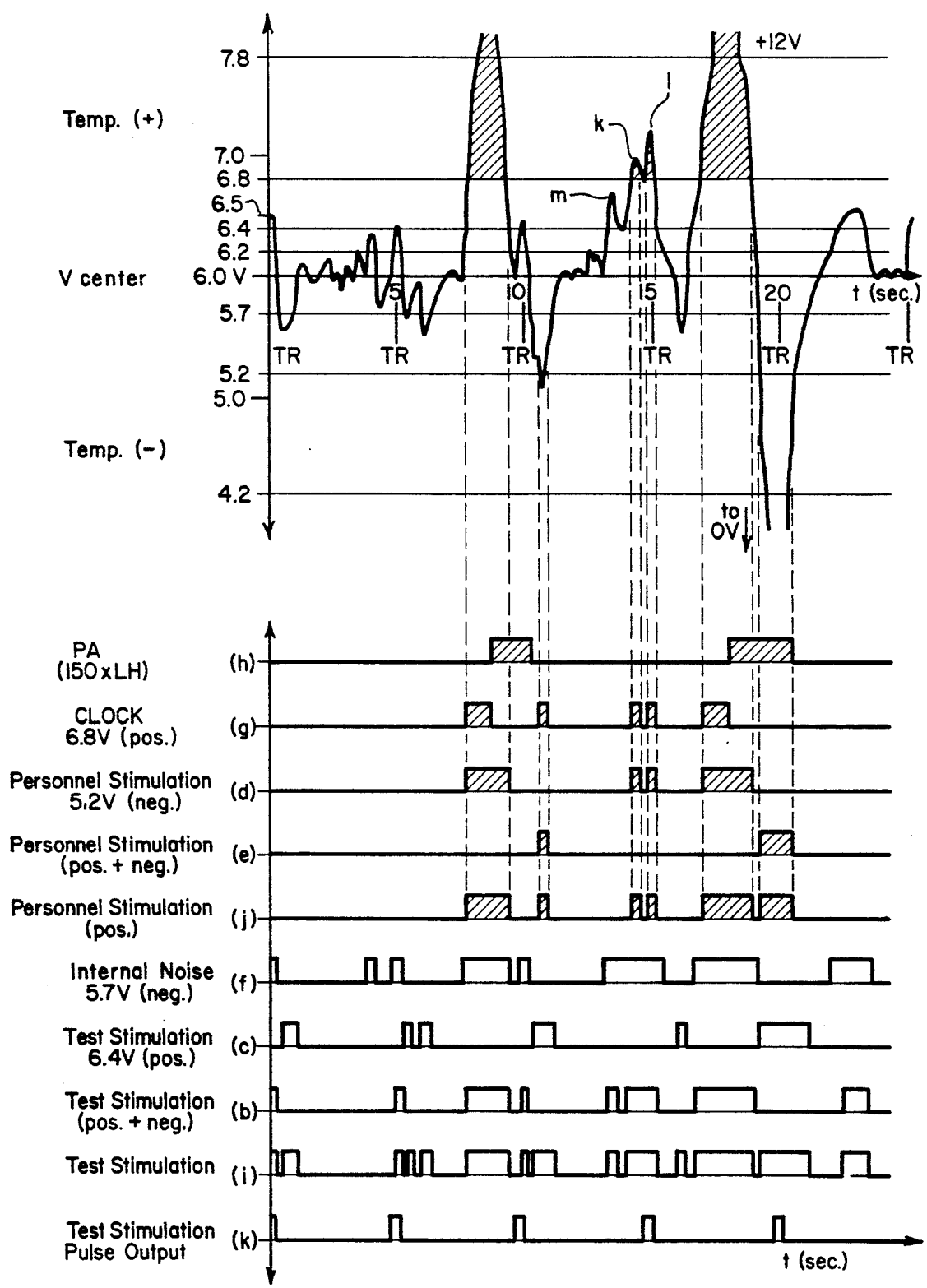
FIG. 2-A

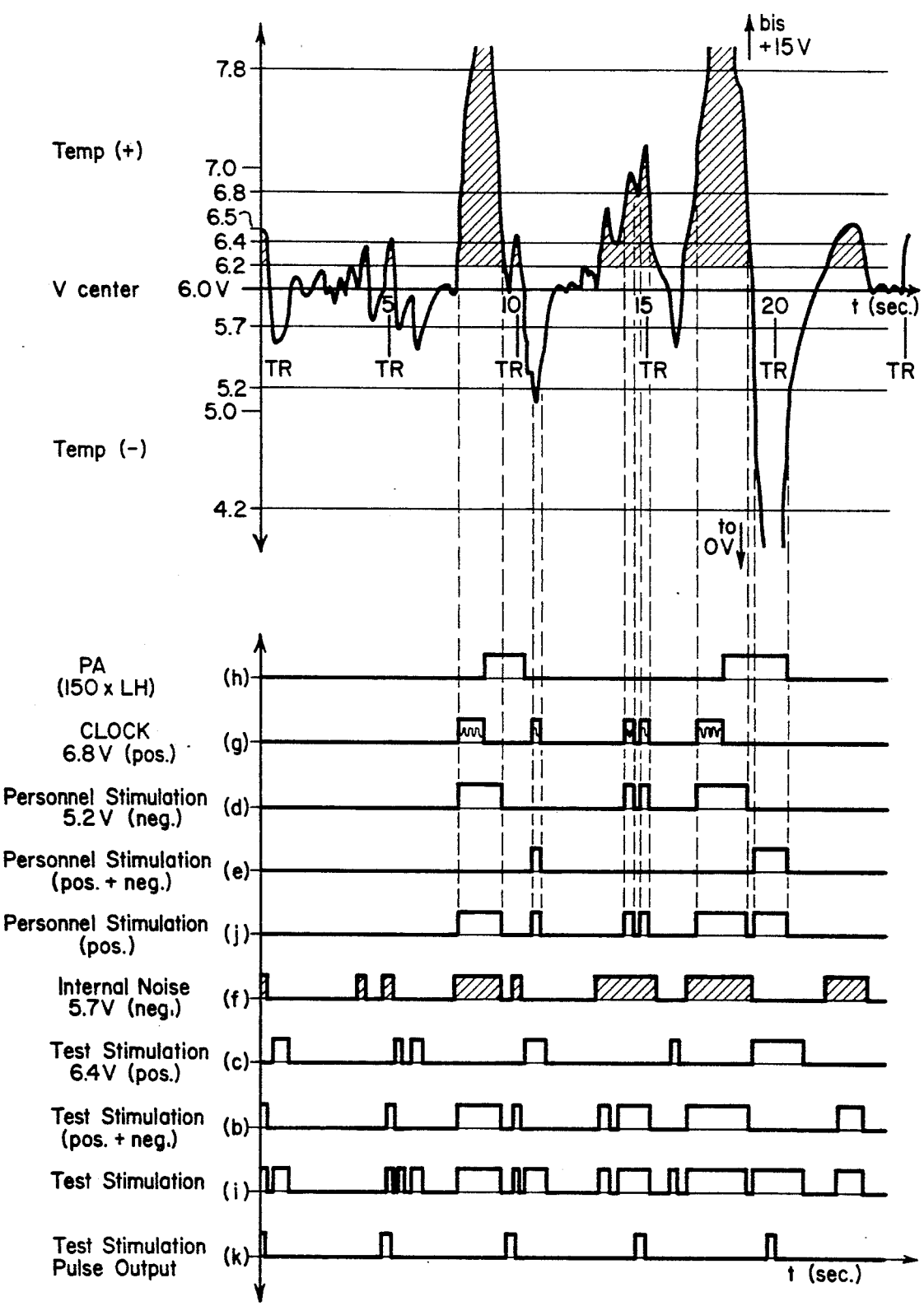
FIG. 2-B

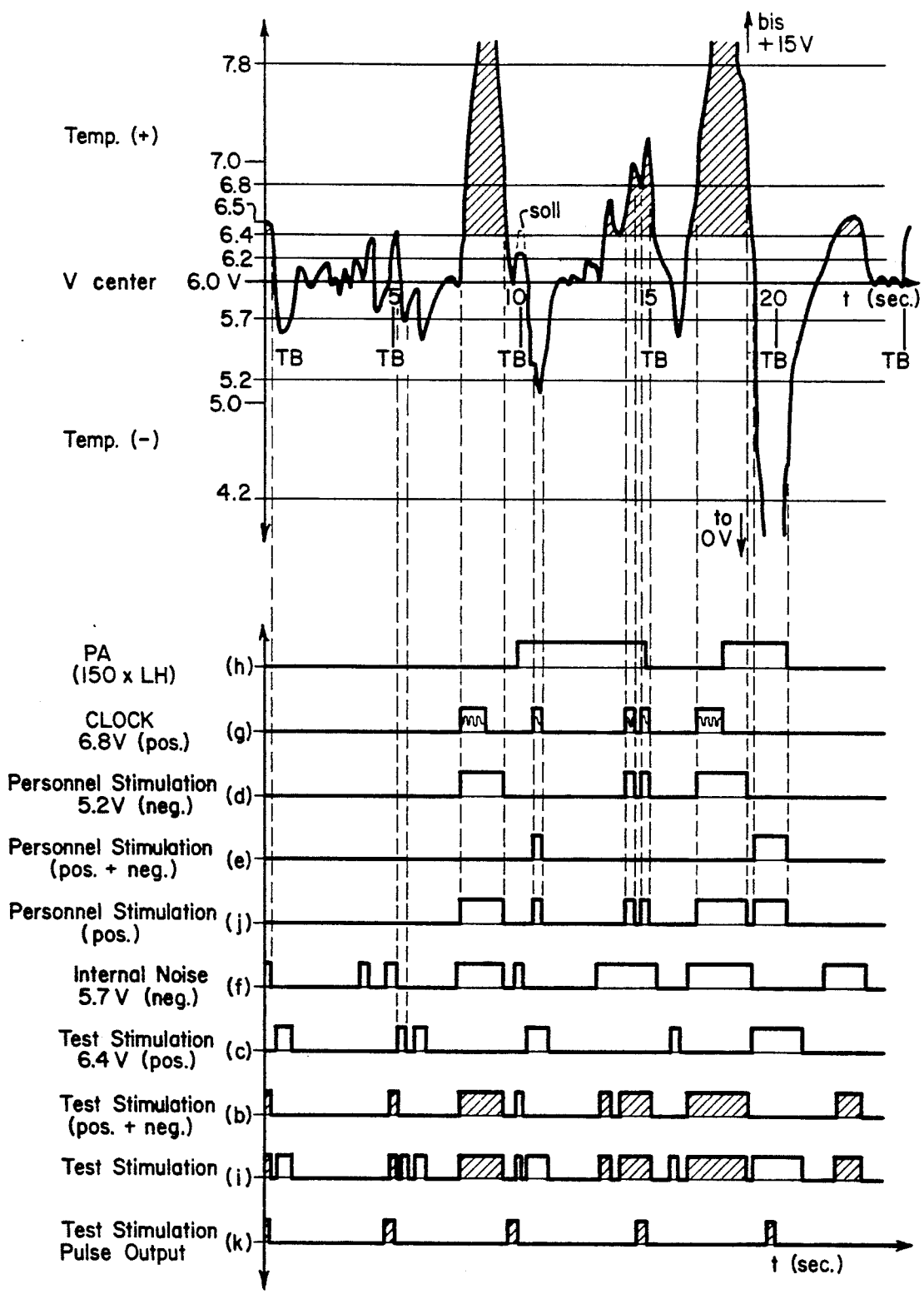
FIG. 2-C

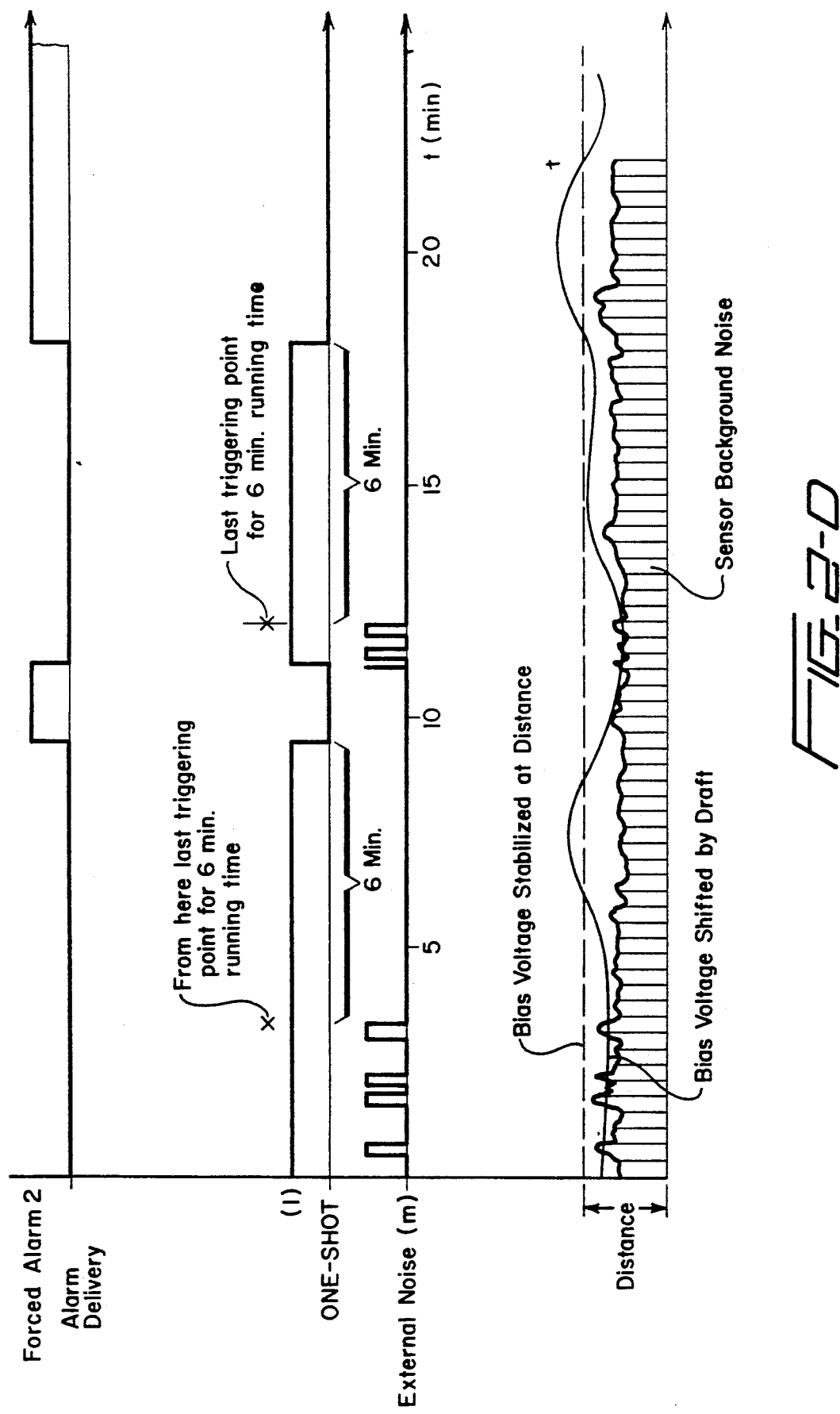
FIG. 2-D

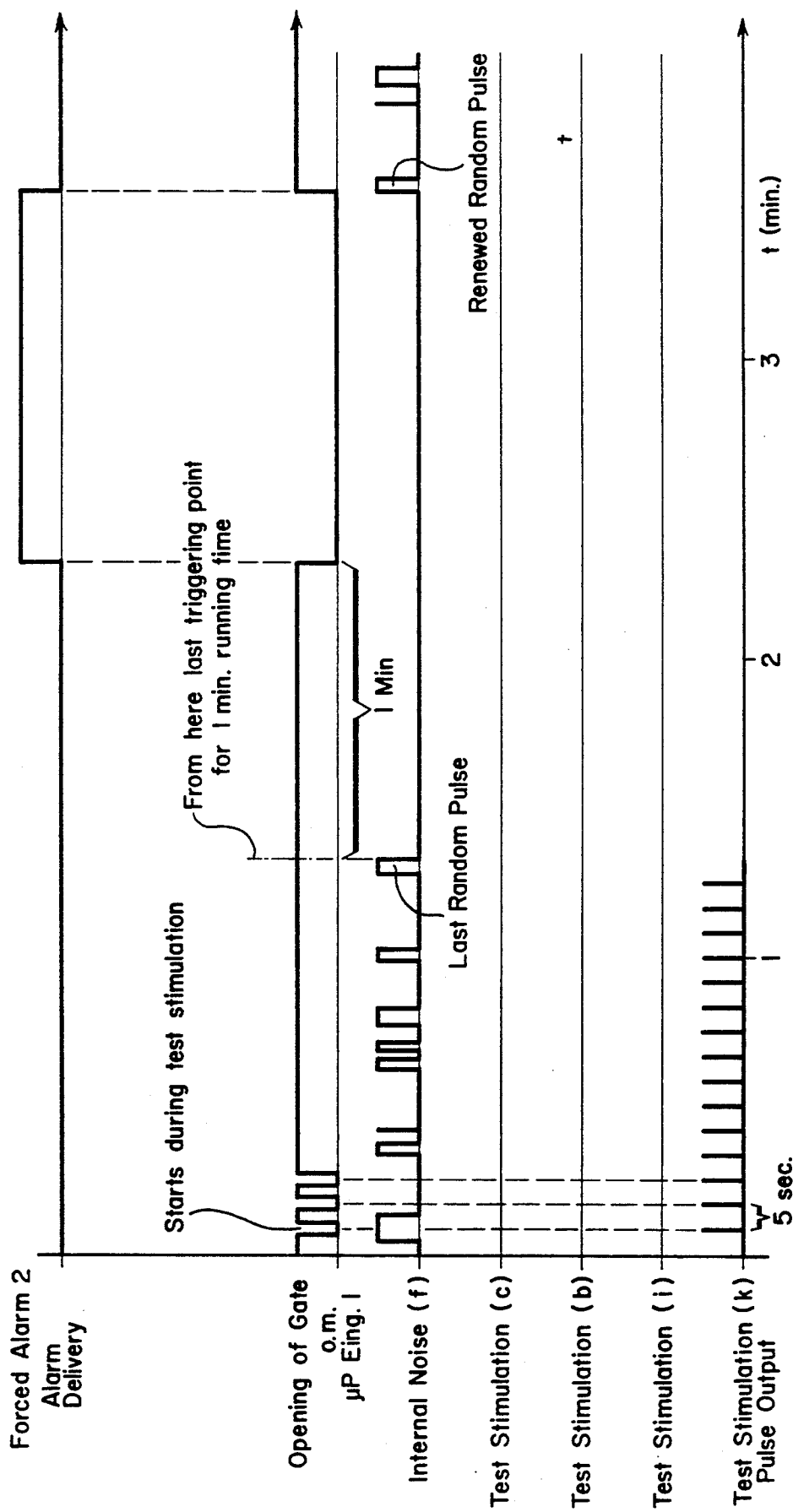
FIG.2-E

FAIL-SAFE TESTING OF AN INFRARED SENSOR ARRANGEMENT

FIELD OF THE INVENTION

The invention relates broadly to fail-safe testing of an infrared sensor arrangement in a condition indicating system.

BACKGROUND OF THE INVENTION

Condition indicating systems incorporating passive infrared sensors are used for space protection (workplace safety), as antitheft devices, such as in museums, and as alarm devices mounted on large trucks for sounding an alarm signal if a person approaches the vehicle. An alarm system incorporating an infrared sensor arrangement is described, for example, in German patent application P 38 37 054.9. In these systems, passive infrared sensors perceive heat sources in a particular monitoring area of the infrared sensor arrangement, and the output signal of the sensors is processed to produce a triggering signal which is applied to an alarm or other condition indicating control circuit.

To promote operational safety and to prevent tampering, it would be desirable to provide continuous fail-safe testing during operation of an infrared sensor to ensure that the unit is operative. For example, if the sensor of an infrared sensor fails, or if the window is blocked, the sensor arrangement and condition indicator will be essentially blind. If this should happen, occurring conditions are no longer detected and indicated by the system.

Failure of active-type sensors such as sonic transmitters is inherently detected during operation because transmitted signals are not received. However, it has not been possible in passive infrared sensor arrangements to provide a truly fail-safe, tamperproof system.

German patent application P 39 09 073.6 shows a process for continuous fail-safe testing of an infrared sensor arrangement of a condition indicator, in which the basic signals of the infrared sensor attributed to noise are greatly amplified and converted to digital signals, whose time occurrence is monitored. If a failure of the digital noise signals over a predetermined time interval is established, a failure indication is triggered. In this process test stimulation signals can also be triggered on the infrared sensor at regular intervals.

SUMMARY OF THE INVENTION

A broad object of the invention is to provide a system for comprehensive fail-safe monitoring and tamper prevention in systems using infrared sensor arrangements.

This object and others are achieved in the present invention by providing two distinct types of periodic monitoring of passive infrared sensor operation. First, the system of the present invention monitors the regular reception by the infrared sensor of basic background noise signals. Such signals are produced as a result of thermal movement of air and from other sources, and have a level below the threshold required to trigger the alarm. If these basic signals fail, a corresponding malfunction indication is given, since it is then assumed that the infrared sensor is no longer operating correctly.

Second, in an important aspect of the invention, an infrared transmitter is provided in the system for producing test signals at regular intervals. These signals are received by the infrared sensor and produce a corresponding output signal of the infrared sensor. The system determines whether the corresponding output signal of the infrared sensor arrives within a specific time after triggering of the infrared transmitter. If not, the malfunction indication is triggered, indicating that the response of the infrared sensor is impaired. The test signal of the infrared signal transmitter has a predetermined level, which produces an output signal of the infrared sensor with a level that is above the level of the basic signals but below the level required to trigger a condition indication. During monitoring of reception of these test signals, monitoring of the basic signals is interrupted to prevent the test signal pulse from being processed as a random basic noise signal.

By monitoring of both the random basic signals and of test signals produced at regular intervals, comprehensive fail-safe testing of a passive infrared sensor can be achieved.

In a further embodiment of the invention, the infrared signal transmitter is positioned several meters from the infrared sensor, and actuated through coded infrared transmissions from the control circuits. In this embodiment, no noise monitoring is required.

BRIEF DESCRIPTION OF THE DRAWINGS

FIGS. 2A through 2E are timing diagrams of the signal waveforms occurring at different points and times in the circuit of FIG. 1;

DETAILED DESCRIPTION OF THE PREFERRED EMBODIMENTS

In general, the present invention is a system which provides two distinct types of periodic fail-safe monitoring of infrared sensor operation. First, the system of the present invention monitors the regular reception by the infrared sensor of basic background noise signals. Such signals are produced as a result of thermal movement of air and from other sources, and have a level below the threshold required to trigger the alarm. If these basic signals fail, a corresponding malfunction indication is given, since it is then assumed that the infrared sensor is no longer operating correctly.

Second, the system provides an infrared transmitter which produces test signals at regular intervals. These signals are received by the infrared sensor and produce a corresponding output signal of the infrared sensor. The circuits of the system determine whether the corresponding output signal of the infrared sensor arrived within a specific time after triggering of the infrared transmitter. If not, the malfunction indication is triggered, indicating that the response of the infrared sensor is impaired. The test signal of the infrared signal transmitter has a predetermined level, which produces an output signal of the infrared sensor with a level that is above the level of the basic signals but below the level required to trigger a condition indication. During monitoring of reception of these test signals, monitoring of the basic signals is interrupted to prevent the test signal pulse from being processed as a random basic signal.

Figure 1:
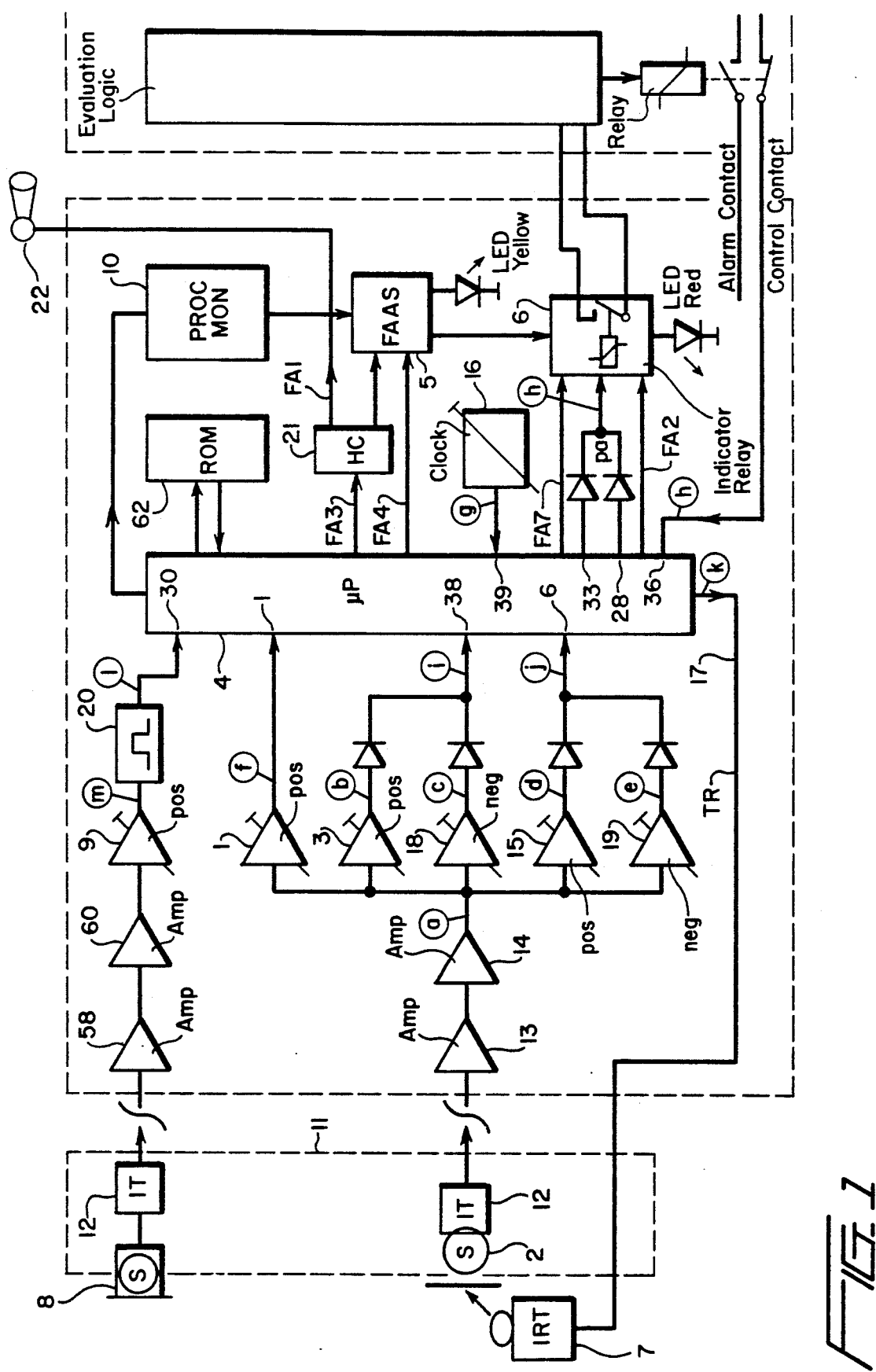
FIG. 1 is a schematic block diagram of the device of the present invention.

FIG. 1 shows a schematic block diagram of an embodiment of the device according to the invention for fail-safe testing of an infrared sensor arrangement of a condition indicator, for example, for an industrial truck.

Preferably, two separate condition indications will be provided in the system: a working alarm for indicating that infrared emissions are sensed and a malfunction alarm for indicating a system fault. Generally, the working alarm will be an audio signal, and the malfunction alarm will be a visual signal. However, either of the condition indications may be transmitted using devices operating in any part of the frequency spectrum, such as through audio, visual (i.e. signal lamps, LEDs, or flags), vibration-producing, or radio-wave signalling means.

Besides indicating reception of infrared emissions, the working alarm will be used to indicate a failure to receive background noise signals at the infrared sensor. Each received basic signal pulse, which is based on a randomly occurring outside stimulation, leads to resetting of a timer of, for example, 6 minutes and thus confirms the receptive condition of the infrared sensor, and particularly that the entry window of the infrared sensor is not obstructed. Timeout times for the timer of between 1 minute and 6 minutes and more can be selected. If no signals are received and the timer times out, the working alarm is actuated.

The malfunction alarm indicates a malfunction in the electronic equipment downstream from the sensor arrangement. The indication of a malfunction alarm differs from the form of an indication of a working alarm, for example, by lights of different colors alternately blinking at the control console. A malfunction alarm will lead to an alarm output with the additionally connected display, distinguishable from the working alarm, on the control console and on an alarm printed circuit board.

The circuitry of the present invention will now be described in detail. As shown in FIG. 1, the infrared sensor arrangement comprises two infrared sensors 2 and 8, one of which, sensor 2, together with an impedance transformer 12, is placed in a housing 11, while the other sensor, 8, is a highly sensitive external sensor and is placed outside housing 11, so that it monitors the "environmental rim" of the condition indicator (random draft measurement).

Sensor 2, placed in housing 11, is connected by impedance transformer 12 to first and second measuring amplifiers 13 and 14, which may be standard operational amplifiers. First measuring amplifier 13 is a low-pass amplifier with a bandpass width of 0.1 to 3 Hz at 3 dB drop or 0.04 to 7 Hz at 12 dB drop. This filtering ensures that the structure-borne sound of the sensor, triggered by mechanical vibrations, is not further amplified. Second measuring amplifier 14 is a linear amplifier, inversely actuated in comparison with first measuring amplifier 13; the phase inversion further counteracts the tendency of vibrations to propagate as output signals.

The output signal of amplifier 14, designated by (a) is applied by five comparators 1, 3, 15, 18, and 19 to a signal processor 4. Signal processor 4 is a microprocessor or microcontroller which preferably includes input and output ports and runs a stored program from ROM 68. The program of ROM 68 implements the input and output functionality described herein and shown in the timing diagrams of FIGS. 2A through 2E. Comparators 18 and 19 must be able to use the negative cooling curve, (i.e. the negative voltage reaction of the sensor), differentially for specific monitoring tasks. Thus, separate triggering levels can be set for negative voltage sensor outputs and positive voltage sensor outputs.

External sensor 8, located outside housing 11, is connected in a similar way by an impedance transformer 12, measuring amplifiers 58 and 60 and a comparator 9 to signal processor 4. Measuring amplifiers 58 and 60 are identical to measuring amplifiers 13 and 14. A one-shot multivibrator 20, located between comparator 9 and signal processor 4, serves to provide a 6-minute pulse to signal processor 4 following each pulse from comparator 9.

Clock generator 16 provides signal processor 4 with a 1 kHz to 2 kHz clock for timing purposes. Clock generator 16 is further connected to a forced alarm actuation stage (FAAS) 5, so that a failure of the clock will lead to a corresponding alarm indication. Forced Alarm Actuation Stage (FAAS) 5 is a means for activating an output alarm signal in response to a change in state of one of a plurality of forced alarm signals FA1 through FA7. FAAS 5 may be implemented using discrete logic, a programmable logic array, an input/output port device, or a separate processing device.

Signal processor 4 processes the output signals of comparators 3 and 18 and produces output signals corresponding to the processing result at its output, which is connected to forced alarm actuation stage (FAAS) 5, which actuates an alarm device 6 in response to signals from signal processor 4 or clock generator 16. Alarm device 6 is connected, for example, to an acoustic or optical alarm or to an all-or-nothing relay, which can turn off the monitoring unit.

The output of signal processor 4 corresponding to the processing of the output signal of comparators 15 and 19 is directly connected to alarm device 6, since these signals indicate that substantial infrared emissions have been detected and it is desirably that these signals should directly actuate an alarm. Output signals of signal processor 4 are also applied to forced alarm actuation stage 5 to trigger an alarm if the fail-safe testing of the infrared sensor arrangement or other electronics, process monitoring, or the monitoring of clock generator 16 indicates a malfunction.

Signal processor 4 produces a pulse on output line 17 at regular time intervals. Output line 17 is connected to an infrared signal transmitter (IRT) 7, which is placed in the visual range of infrared sensor 2, so that its infrared output signal can be received by the infrared sensor 2. Infrared signal transmitter 7 is preferably a thermal transmitter and produces an infrared stimulation test signal in response to a signal pulse from signal processor 4. When the infrared stimulation test signal is received by infrared sensor 2, sensor 2 produces an output signal with a corresponding width and level, with the level related in a known manner to the "basic signal" (noise) level of infrared sensor 2 and to the output signal level of infrared sensor 2 occurring when substantial infrared emissions have been detected.

The design is preferably such that, starting from a basic signal voltage of 6 V, the level of amplified random basic signals of infrared sensor 2 can be up to 6.15 V, while the level of the amplified signals of infrared sensor 2 when substantial infrared activity is detected, for example due to the entry of a person into the monitoring area, is between 6.8 and 7.8 V. Consequently, infrared signal transmitter 7 delivers an infrared pulse in response to a triggering pulse. When the signal transmitted by infrared signal transmitter 7 is received by infrared sensor 2, it produces an exactly defined output signal at the output of amplifier 14, with a level of 6.5 V. Appropriate threshold values may be established with potentiometers on respective comparators 1, 3, 15, 18, and 19 to produce these desired response values. Preferably, infrared signal transmitter 7 is actuated every 5 seconds with a 200-ms pulse from signal processor 4.

Signal processor 4 is connected to forced alarm actuation stage 5 by a process monitoring stage 10, which serves to actuate forced alarm actuation stage (FAAS) 5 if the internal working processes of the signal processor 4 malfunction or fail. Thus, process monitoring stage is a means for monitoring the continued operation of signal processor 4 itself.

When the system is activated and no strong infrared radiation sources are in the covered area, the sensors 2 and 8 will produce noise signals reflecting the presence of convection currents in the air. The basic (noise) signals have a very low level that is preferably between 6 V and 6.15 V. The basic signals are applied to signal processor 4 by switching circuits downstream from sensors 2 and 8, particularly by comparators 1 and 9. Comparators 1 and 9 compare the applied analog signals with their specific threshold values and thus produce pulse-shaped output signals with specific levels and with edges located where the analog input signals go above or below the specific threshold values. Comparators 1 and 9 therefore operate as a simple analog-to-digital converter, with their own switching hysteresis.

In signal processor 4, which by internal Schmitt trigger programming responds to the edges of the input pulses that come from comparator 1, the time intervals of the arriving pulses are compared with specific reference time intervals. If no signal pulse arrives from comparator 1 within the defined reference time interval, signal processor 4 delivers an output signal actuating alarm device 6. The signal from comparator 9 is processed using the same general principles, but the corresponding actuating output signal from signal processor 4 is applied to forced alarm actuation stage 5 rather than alarm device 6.

In the preferred embodiment, every 5 seconds, signal processor 4 produces a pulse with duration of 200 ms over line 17 to actuate infrared signal transmitter 7. Infrared signal transmitter 7 then transmits a 200 ms infrared pulse as a test stimulation signal, and this signal is received by infrared sensor 2 if the sensor 2 has not malfunctioned or been tampered with. The output signal produced in response by infrared sensor 2 is applied to comparators 1, 3, 15, 18, and 19 by impedance transformer 12 and amplifiers 13 and 14, and comparators 3 and 18 are designed so that their threshold values are above the threshold values of comparator 1 and below the threshold values of comparators 15 and 19, so that comparators 3 and 18 respond only to the output signals of infrared sensor 2 resulting from test stimulations. The corresponding pulse signals from comparators 3 and 18 are applied to signal processor 4. These pulse signals take the form of separate signal pulses, whose edges are applied at the places which correspond to specific threshold values of comparators 3 and 18. Signal processor 4 monitors the time that passes until the reaction signal pulse arrives from comparators 3 and 18 after delivery of the 200-ms activation pulse to infrared signal transmitter 7. If this time is greater than the reference time interval, a fault is detected and a corresponding alarm signal from signal processor 4 is applied to the alarm device for 5 seconds. In case of a malfunction, for example, if the window of the infrared sensor has lost 20% of its transmission capability because of dirt obscuring the window, the operator of the unit is made aware of a fault condition by a rhythmic intermittent operation in a 5-second cycle. Thus, the fault indication is distinguishable from an intrusion condition which is indicated by a continuous alarm output.

Since comparator 1 has a low threshold setting to permit detection of the noise signals, it would naturally also respond to the output signals of infrared sensor 2 resulting from the test stimulation. These output signals of the infrared sensor would be considered and processed as noise signals, which would prevent triggering of the malfunction alarm despite great gaps in time of reception of actual noise signals. To permit detection at the same time of both missing noise signals and failure to receive a test signal, the evaluation of the output signals of comparator 1 is interrupted during the time interval in which the reaction pulse is expected to fall following a test stimulation.

As shown in FIG. 1, the output signal of infrared sensor 2 is also applied through impedance transformer 12 and amplifiers 13 and 14 to comparators 15 and 19, which respond only to signals with a level above the levels of test stimulation signals and random background noise signals. Comparators 15, 19 therefore respond to signals that result from an actual detection of elevated infrared activity, and these signals from signal processor 4 are processed to produce an output signal which is applied directly to alarm device 6 to trigger the continuous "working" alarm.

The above embodiments of the device according to the invention can be designed so that the reference time interval, with which the time interval of the pulses of the output pulse signal of comparators 1 and 9 is compared, is about 6 minutes. If within 6 minutes no randomly triggered pulse occurs, a fault is detected, and a corresponding alarm is triggered. The time interval monitored for the arrival of a reaction pulse following the test stimulation is preferably about 100 ms. If no reaction pulse is applied to signal processor 4 within 100 ms after delivery of the triggering pulse to line 17, an alarm is triggered. During this 100-ms interval, the processing of the output signal of comparator 1 is interrupted as indicated above. Further, signal processor 4 can be designed so that it perceives not only the arrival of a pulse signal from comparators 15 and 19, which indicates an elevated level of infrared activity, but also measures the duration of this pulse signal in terms of clock cycles from pulse transmitter 16, to determine whether this signal comes from a strong or less strong heat source. In this way, the system can distinguish between personnel and warm objects in the scanned area.

A feedback indication is provided from the alarm relay or toggling relay, using contacts coupled to signal processor 4 through path (n). By monitoring these contacts, this switching circuit can be functionally tested. Further, it is important in the further processing of the delivered alarm signal by outside units to provide a possibility of warning of personnel by automatic interval horns. This can be achieved by a horn control 21 and downstream signal horn 22.

The mode of operation of the above embodiments of the device according to the invention is explained in greater detail with reference to FIGS. 2A through 2E. For clarity, the signal patterns represented in FIGS. 2A to 2E are only partly and approximately reproduced. In a personnel detection alarm, for example, triggering pulses may occur which control the comparators up to stop values of +12 V and 0 V.

The hatched regions of the signal patterns represent the relevant signals and signal parts for the occurrence of a personnel alarm in the safe state, in which only basic signals are produced and with triggering of a test stimulation according to FIGS. 2A, 2B and 2C.

If, as shown in FIG. 2A, a sensor signal peak occurs at point (a) in FIG. 1 that exceeds the set threshold value of 6.8 V, comparator 15 is force-toggled so that an output signal with high level is applied to pin 6 of signal processor 4. At the same time, pin 39 on signal processor 4 is removed from the monitoring loop and clock generator 16 is connected directly. As long as clock generator 16 is not used, signal processor 4 tests its functioning and in case of a defect, signal processor 4 delivers a forced alarm FA4. Clock generator 16 has a variable frequency setting, which is set in six steps by a switch to the corresponding response time of the monitoring unit. The frequency setting is between 300 Hz and 1.5 kHz. As soon as these two signals are applied, microprocessor 4 begins to count 150 transitions of the clock signal from high to low level. If at the end of 150 cycles the output signal of comparator 15 continues to have a high level, signal processor 4 delivers a signal with high level to its outputs 33 and 28, which actuate alarm device 6, causing the alarm relay to be released. To achieve the greatest possible safety the alarm signal is delivered twice and is secured by decoupling diodes.

Analogously, the same process is applied to negative sensor signal peaks. For this purpose, the threshold value is set at 5.2 V on negative comparator 19. As can be seen from the pulse diagram of FIG. 2A, in which the signal peaks are identified with m, k and l, signal k briefly triggered the counting process but did not lead to the alarm, since the counting process could not be completed. Thus, an erroneous alarm was prevented.

In the falling phase of pulse peak k, the test stimulation pulse also falls (at time 15 sec.), producing a new erroneous alarm peak l. This erroneous alarm signal is prevented from propagating by the method described above.

The threshold value voltage of comparator 15 can be set at an infinite number of values between 6.8 V (sensitive setting) and 7.8 V (insensitive setting) by the assembler of the monitoring unit. Analogously, a setting between 5.2 V and 4.2 V on comparator 19 is possible.

In FIG. 2A it can be seen from the signal at point (h) that the personnel alarm delivery in the negative signal wave area was prolonged only by the overlapping and not by another counting time. To maintain the alarm only as long as absolutely necessary, in this case microprocessor 4 refrains from performing another counting process. The personnel alarm delivery time is programmed to be at least 1.0 seconds in duration.

The pulse sequences occurring at other points under these circumstances have no effect on this operation of the microprocessor program.

FIG. 2B shows the timing of signals occurring during reception of random noise signals by internal sensor 2. If it is assumed that internal sensor 2 can receive stimulation pulses from its environment only if its sight is not obstructed, then a moving truck could be monitored by the condition indicator. As noted previously, a cyclic monitoring with a test stimulation is added to the monitoring of random noise reception.

A sensor traveling with a monitored truck constantly receives minimal outside stimulations, which are far below the response threshold of the alarm stage, i.e., the corresponding comparator. These and also the strong personnel alarm pulses, which are also of the random noise type and thus represent a confirmation that the view of the sensor is not obstructed, act to reset a countdown timer in microprocessor 4. The countdown timer, which may be of 1 minute duration, runs from the last triggering point, upon timeout of the timer microprocessor 4 applies an output signal with a high level to alarm device 6. Alarm device 6 may then produce stoppage of the vehicle. The occurrence of this condition is reflected in the flashing of the indicator LED and in the LED on the related electronics. The coded blinking sequence may also give information on which condition indicator triggered the alarm and for what reason.

To avoid resetting the timer in response to the cyclic test stimulation, since the test stimulation signal is greater than the noise level, signal processor 4 stops the evaluation of the random noise level for about 1 second during this response phase of the test stimulation.

The next occurring pulse resets the countdown timer and cancels the alarm state. Noise pulses may be absent if the alarm is mounted on the back of an industrial truck which is backed against a wall so that sensors on the rear of the truck cannot be stimulated. By a travel of about 1 meter at creeping speed, all condition indicators are again put into operation.

By the above monitoring of the random basic signals it is assured that upon blockage of the sensor, such as by covering the windows, an alarm will be triggered.

FIG. 2C shows the timing of signals occurring during triggering of a test stimulation. The pulse for thermal transmitter 7, regularly gated every 5 seconds, occurs at point (k). The level and duration of this signal are defined so that in sensor 2 a positive pulse peak with a level of 6.5 V is produced on amplifier output (a) shown in FIG. 1.

The exact known magnitude of this signal is used as a reference to determine current window visibility and proper operation of the electronics downstream from sensor 2.

The stimulation current pulse coming from thermal transmitter 7 with a strength of about 30 mA produces at point (a) a signal peak of 6.5 V, causing positive comparator 3 to change state, thus generating a high level signal at microprocessor input 38. Upon receiving the pulse, microprocessor 4 scans input 38 for a period of about 1 second, and upon receiving the back pulse determines that no defect is present, and therefore lets the program continue without interruption.

If the pulse is too small or is not received, microprocessor 4 delivers a forced alarm signal FA7 at its outputs 28, 33 for the period of 5 seconds. It does not treat the reception failure as a malfunction (see time=10 seconds in FIG. 2C). The reason for this is that the window of infrared sensor 2, if it becomes dirty, would do so only gradually. Therefore, the driver is to recognize by the driving behavior of his vehicle that something is wrong with the condition indicator. The identification sign is a cyclic travel over 5 sec., an alarm over 5 sec., a travel over 5 sec., an alarm over 5 sec., etc. The driver can then determine by observing the slowly blinking LED readout which indicator is the cause and thus eliminate the defect at an early stage.

FIG. 2D shows a timing diagram for signals produced during draft measurement, i.e., environmental rim. The environmental rim of the condition indicator is detected to a high degree by the two above-described monitoring processes. But if a plastic bag made from a very thin transparent sheet material were to be pulled over the condition indicator, certain stimulations are still recognizable but are completely distorted in their intensity. Detection of such a fault by monitoring of random basic noise signals is impossible. The test stimulation disclosed also does not detect a "hooding" of the sensor.

Therefore, such tampering can be detected only by the draft measurement process. Normally, slightly moving air, even though of only slightly different temperature, is constantly blown around highly sensitive external sensor 8, creating a draft noise signal. In stationary air, the resulting slight voltage levels are no longer of sufficient magnitude to actuate connected comparator 9.

Noise measurements have shown that pyroelements have an unusually high and very erratic noise portion for electronic components. This property can advantageously be used in that a stabilized reference voltage just above the noise level is established and thus a kind of filter is established. The very slowly moving air produces in the connected DC coupled low-pass filter a bias voltage shift of a few tenths of a volt. This voltage drop is sufficient to convert these noise peaks to quickly changing pulses, which can be easily further processed. The effects of this processing are shown in the lower part of FIG. 2D. The bias voltage is stabilized hard but applied soft above 1% resistances.

The pulses obtained in this way start one-shot 20 with, for example, a time constant of 6 minutes. The running time of 6 minutes then starts from the last triggering instant so that signal processor 4 delivers to signal device 6 at the end of this running time a signal with high level. Signal device 6 then triggers the final vehicle stop. The operating status of the system can be observed through blinking of corresponding LEDs. The coded blinking sequence of the malfunction LED then identifies the condition indicator which caused the alarm and the reason for the alarm. The next occurring pulse starts the running time again and cancels the alarm state.

FIG. 2E is a timing diagram showing signals occurring during monitoring of the basic noise signals in conjunction with monitoring of the simultaneously occurring test stimulations at point (k).

Additional embodiments of the invention will now be described with reference to FIGS. 3 through 5.

Figure 3:
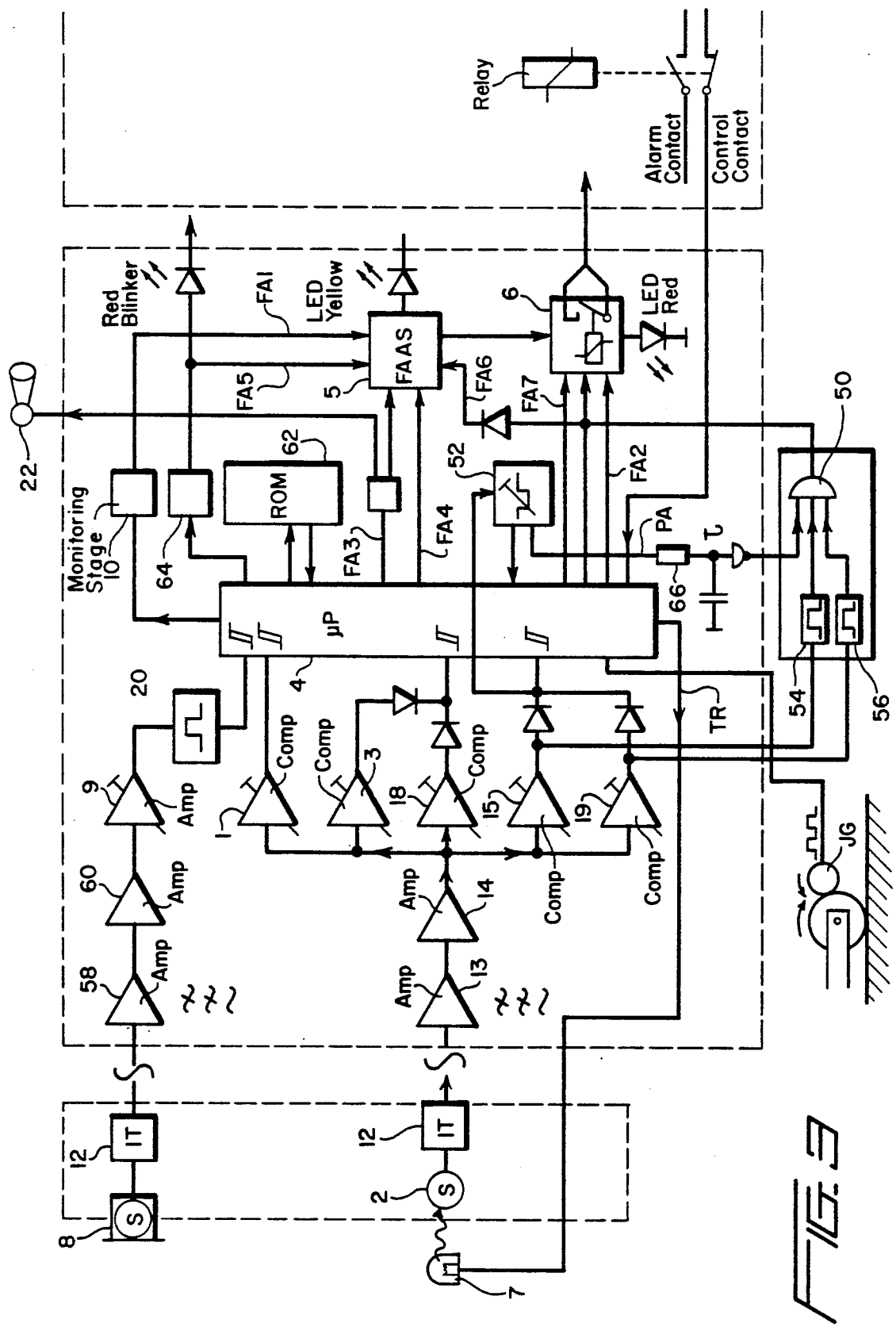
FIG. 3 is a schematic block diagram of a further embodiment of the present invention.

FIG. 3 shows an embodiment of the invention including a second alarm delivery circuit which is used to indicate a program malfunction of the microprocessor, which would prevent the processing of alarm signals produced by comparators 15 and 19. The second alarm circuit is enabled by substituting a variable timer 52 for the clock generator 16 of FIG. 1. In addition, a toggle AND gate 50 is provided with its output connected through an inverter to FAAS 5. The outputs of comparators 15 and 19 are each connected to an input of the AND gate 50 through one-shots 54 and 56 respectively. A timer circuit comprising variable timer 52 and delay means 66 is connected as a further input to AND gate 50 is provided for delaying the response time to the first occurrence of a high level of the alarm comparators 15 and 19.

If amplifier 14 delivers a signal of sufficient level to activate comparators 15 and 19, depending on the direction of the stimulation, first one of the comparators 15 and 19 will respond and then the other will respond after the negative swing in voltage of the sensor.

The two sequentially arriving high level peaks toggle one-shots 54 and 56 for about 2 seconds. But since microprocessor 4 determines the alarm pulse period after which an alarm is delivered, an adjustable timer 52 is substituted for clock generator 16 of FIG. 1. With the occurrence of a first alarm pulse timer 52 is started and supplies microprocessor 4 as well as triple AND gate 50, through an inverter, with the time information needed for suppression of erroneous alarms. Delay timer 66 prevents gate 1 from coming to the high level by the starting edge. After the triggering of adjustable timer 52, a high level comes from the inverter so that the connected input of AND gate 50 comes to a high level. The first occurring alarm pulse puts the input of AND gate connected to either one-shot 54 or one-shot 56 at a high level. After the backswing the second alarm comparator brings the remaining input of AND gate 50 to a high level. The output signal of the AND gate then comes to a high level, signalling an alarm delivery condition. The lack of a high level of either of the comparators 15 and 19 leaves the output of AND gate 50 at low level. After the end of the alarm pulse, all inputs of AND gate 50 return to the low level. An LED controller 64 is connected to selectively blink a red LED if a failure in the signal processor 4 is detected.

Figure 4:
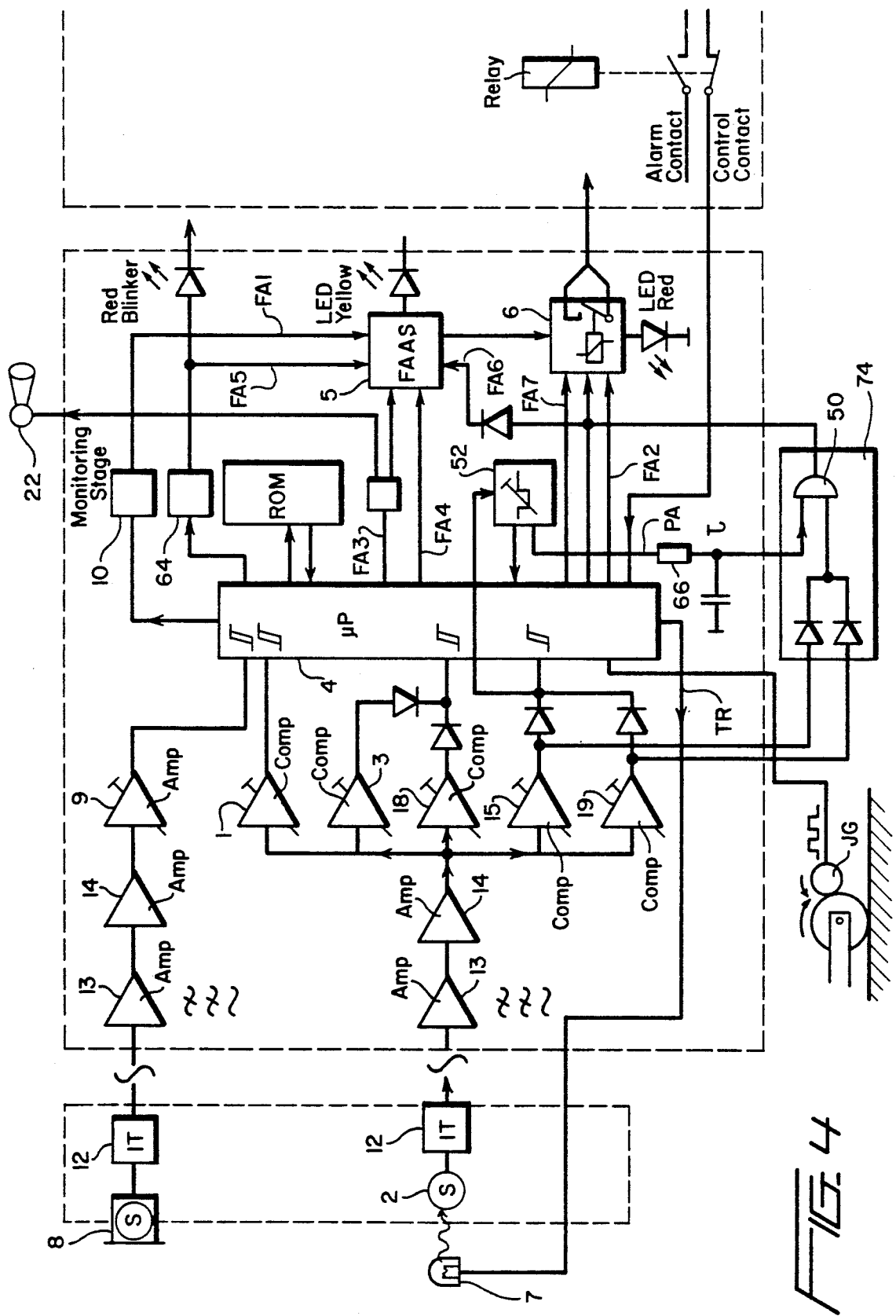
FIG. 4 is a schematic block diagram of a modification of the circuit of FIG. 3.

A further embodiment of the invention is shown in FIG. 4, which is distinguished from the embodiment represented in FIG. 3 in that the draft measurement is modulated by the random background noise of the sensor and is evaluated by microprocessor 4 and protected from a faulty interpretation. In this embodiment, AND gate 50 has only two inputs. No inverter is provided between one-shot 52 and the first input of AND gate 50. Also, one-shot 52 is operated with negated output. No one-shots are provided between comparators 15 and 19 and the AND gate 50.

It is possible that slow air currents will not trigger any comparator pulses on the direct path of the evaluation. If the response threshold of the comparator is stably placed just above the random noise peaks, whenever the draft lowers the average equal level somewhat, the noise peaks break through and reliably cause the downstream comparator to respond. A possible level draft upward or downward is examined by the microprocessor and causes a forced alarm.

It may be difficult in the circuit of FIG. 3 to adjust one-shots 54 and 56 at the inputs of AND gate 50 to respond at the desired time. In the circuit of FIG. 4, the constant examination of the two comparators 15 and 19 is dispensed with and the two outputs are combined in a time adding stage 74, comprising AND gate 50 with the outputs of comparators 15 and 19 each linked by an inverter to the same input of AND gate 50, so that with the first occurring pulse the second input of AND gate 50 is always placed immediately at the high level. This seems justifiable, since at every morning start-up a personnel alarm inspection phase established in the program of microprocessor 4 must be performed. Moreover, in some cases the unit will be turned on only shortly before the activation phase.

Figure 5:
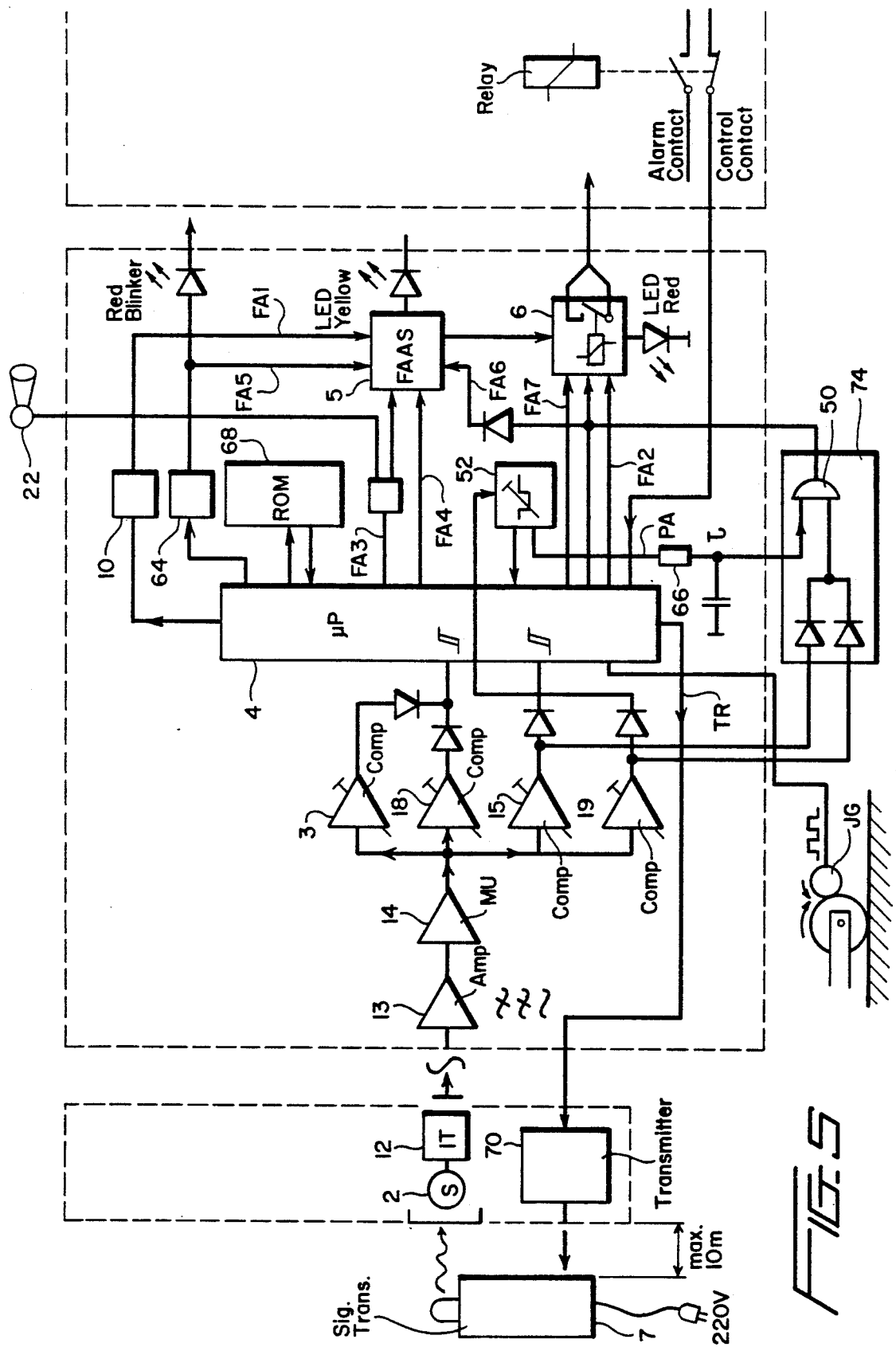
FIG. 5 is a schematic block diagram of another embodiment of the present invention in which the infrared transmitter is positioned remotely from the sensor housing.

FIG. 5 shows a further embodiment of the invention, which is characterized in that the test stimulation thermal pulse is produced not directly in front of the input window of the sensor, but by a unit 7 in s separate housing at a distance up to several meters (i.e. 10 m) from the sensor 2. The communication of the test stimulation command from the condition indicator to the thermal transmitter in this embodiment takes place by an unfocused coded infrared light ray emitted under control of signal processor 4 by transmitter 70.

The thermal transmitter 7 decodes the received signal from transmitter 70 and transmits a thermal pulse of defined intensity and duration, after determining that the received signal is a proper command.

The precise pulse value at the input window of the sensor of the indicator is automatically measured, within about 20% of the preset measuring value. This means that a window dirtying of more than 20% leads to a forced alarm, which is also the case if the monitoring section loses transparency.

If for any reason the intensity of the thermal pulse rises, it results in a rhythmic alarm delivery.

The random noise monitoring stage is unnecessary in the embodiment of FIG. 5, since the remote test stimulation pulse takes over the anti-manipulation security function. For the same reason, the random outside noise monitoring stage is also not used in this embodiment.

I claim:

1. A system for fail-safe testing of an infrared sensor arrangement including at least a first infrared sensor having an output, an amplifying circuit connected to an output of the infrared sensor to produce an amplified infrared sensor output signal having a signal level, comprising:

a signal processing circuit connected to the amplifier and responding to the amplified infrared sensor output signal to transmit an output alarm signal to a condition indicating device to trigger a condition indication;

first comparator means, connected to the amplifying circuit, for receiving the amplified infrared sensor output signal and comparing the signal level with at least one first determined threshold value corresponding to a signal level produced when substantially no infrared activity is detected by the infrared sensor, to produce a pulse signal for transmission to the signal processing circuit whenever the amplified sensor output signal level exceeds said first threshold value;

second comparator means, for receiving the amplified infrared sensor output signal and comparing the signal level with at least one second determined threshold value, to produce a pulse signal for transmission to the signal processing circuit when infrared activity is detected; and infrared signal transmitting means periodically actuated by the signal processing circuit for transmitting an infrared test pulse of defined level and duration detectable by the infrared sensor, and which produces a signal level of the amplified infrared sensor output signal which is above said first determined threshold value and below at least one said second determined threshold value;

wherein the signal processing circuit monitors the interval between successive pulse signals produced by the first comparator means and triggers a condition indication when no signals are produced by the first comparator means within a predetermined first time period; wherein the signal processing circuit, after triggering the infrared signal transmitting means, monitors said second comparator means for indications that said test pulse has been received during a predetermined second time period, and triggers a condition indication when no signals indicative of reception of the test pulse are produced by the second comparator means during the second time period; and wherein, during the second predetermined time period, the signal processing circuit prevents processing of any response to the test pulse by the first comparator.

2. The system of claim 1, wherein the signal processing circuit is constructed so as to respond to edges of input signals.

3. The system of claim 2, including a forced alarm actuation stage connected between an output of the signal processing circuit to the condition indicating device, and the condition indicating device.

4. The system of claim 1 including a forced alarm actuation stage connected between an output of the signal processing circuit to the condition indicating device, and the condition indicating device.

5. The system of claim 4, further including coincidence generator means connected to the signal processing circuit and the forced alarm actuation stage for producing a clock pulse to the signal processing circuit and the forced alarm actuation stage, wherein upon failure of the signal processing circuit to receive the clock pulse during a defined time period the signal processing circuit acts as a means for causing an alarm signal to be applied to the condition indicating device.

6. The system of claim 1, wherein said first comparator means comprises a comparator pair and said second comparator means also comprises a comparator pair, with one comparator of each comparator pair having a positive voltage threshold setting and the other comparator of each pair having a negative voltage threshold setting.

7. The system of claim 6, including a forced alarm actuation stage connected between an output of the signal processing circuit to the condition indicating device, and the condition indicating device.

8. The system of claim 6, wherein the signal processing circuit is constructed so as to respond to edges of input signals.

9. The system of claim 8, including a forced alarm actuation stage connected between an output of the signal processing circuit to the condition indicating device, and the condition indicating device.

10. The system of claim 9, further including coincidence generator means connected to the signal processing circuit and the forced alarm actuation stage for producing a clock pulse to the signal processing circuit and the forced alarm actuation stage, wherein upon failure of the signal processing circuit to receive the clock pulse during a defined time period the signal processing circuit acts as a means for causing an alarm signal to be applied to the condition indicating device.

11. The system of claim 3, further including coincidence generator means connected to the signal processing circuit and the forced alarm actuation stage for producing a clock pulse to the signal processing circuit and the forced alarm actuation stage, wherein upon failure of the signal processing circuit to receive the clock pulse during a defined time period the signal processing circuit acts as a means for causing an alarm signal to be applied to the condition indicating device.

12. The system of claim 7, further including coincidence generator means connected to the signal processing circuit and the forced alarm actuation stage for producing a clock pulse to the signal processing circuit and the forced alarm actuation stage, wherein upon failure of the signal processing circuit to receive the clock pulse during a defined time period the signal processing circuit acts as a means for causing an alarm signal to be applied to the condition indicating device.

13. The system of claim 3, further including a process monitoring stage connected between the signal processing circuit and the forced alarm actuation stage wherein the forced alarm actuation stage is responsive to a malfunction of the signal processing circuit for triggering the condition indicating device.

14. The system of claim 4, further including a process monitoring stage connected between the signal processing circuit and the forced alarm actuation stage wherein the forced alarm actuation stage is responsive to a malfunction of the signal processing circuit for triggering the condition indicating device.

15. The system of claim 7, further including a process monitoring stage connected between the signal processing circuit and the forced alarm actuation stage wherein the forced alarm actuation stage is responsive to a malfunction of the signal processing circuit for triggering the condition indicating device.

16. The system of claim 9, further including a process monitoring stage connected between the signal processing circuit and the forced alarm actuation stage wherein the forced alarm actuation stage is responsive to a malfunction of the signal processing circuit for triggering the condition indicating device.

17. The system of claim 1, including a second infrared sensor placed outside the housing of the first infrared sensor and having greater sensitivity than the first infrared sensor, and connected to the signal processing circuit by a third comparator means for comparing the output signals of the second infrared sensor with third threshold values and applying comparison pulse signals to a monitoring circuit means connected to the signal processing circuit, said monitoring circuit means producing an output signal which maintains a first state as long as a comparison pulse signal is received by said monitoring circuit means within each passage of a third reference time interval, wherein the signal processing circuit serves as a means for triggering a condition indication in response to failure of said comparison pulse signal to be produced within said third reference time interval.

18. The system of claim 6, including a second infrared sensor placed outside the housing of the first infrared sensor and having greater sensitivity than the first infrared sensor, and connected to the signal processing circuit by a third comparator means for comparing the output signals of the second infrared sensor with third threshold values and applying comparison pulse signals to a monitoring circuit means connected to the signal processing circuit, said monitoring circuit means producing an output signal which maintains a first state as long as a comparison pulse signal is received by said monitoring circuit means within each passage of a third reference time interval, wherein the signal processing circuit serves as a means for triggering a condition indication in response to failure of said comparison pulse signal to be produced within said third reference time interval.

19. The system of claim 4, including a second infrared sensor placed outside the housing of the first infrared sensor and having greater sensitivity than the first infrared sensor, and connected to the signal processing circuit by a third comparator means for comparing the output signals of the second infrared sensor with third threshold values and applying comparison pulse signals to a monitoring circuit means connected to the signal processing circuit, said monitoring circuit means producing an output signal which maintains a first state as long as a comparison pulse signal is received by said monitoring circuit means within each passage of a third reference time interval, wherein the signal processing circuit serves as a means for triggering a condition indication in response to failure of said comparison pulse signal to be produced within said third reference time interval.

20. The system of claim 1 wherein the alarm signal is applied to a relay means for transmitting the alarm signal to the condition indicating means and for providing a feedback indication to the signal processor.

21. The system of claim 17 wherein the alarm signal is applied to a relay means for transmitting the alarm signal to the condition indicating means and for providing a feedback indication to the signal processor.

22. A system for fail-safe testing of an infrared sensor arrangement including a first infrared sensor having an output, an amplifying circuit connected to an output of the infrared sensor to produce an amplified infrared sensor output signal having a signal level, comprising:
  a signal processing circuit connected to the amplifier and responding to the amplified infrared sensor output signal to transmit an output alarm signal to a condition indicating device to trigger a condition indication;
  comparator means for receiving the amplified infrared sensor output signal and comparing the signal level with at least one predetermined threshold value, to produce a pulse signal for transmission to the signal processing circuit when infrared activity is detected; and
  infrared signal transmitting means periodically actuated by the signal processing circuit for transmitting an infrared test pulse of defined level and duration detectable by the infrared sensor, and which produces an amplified infrared sensor output signal to the comparator means;
  wherein the signal processing circuit, after triggering the infrared signal transmitting means, monitors said comparator means for indications that said test pulse has been received during a predetermined time period, and triggers a condition indication when no signals indicative of reception of the test pulse are produced by the comparator means during the time period.

23. The system of claim 22, wherein the infrared signal transmitting means is located in a housing separate from a housing containing the infrared sensor.

24. The system of claim 23, wherein the infrared signal transmitting means operates to transmit said test pulses in response to wireless signals transmitted under control of the signal processing circuit.

* * * * *